Figure 1:
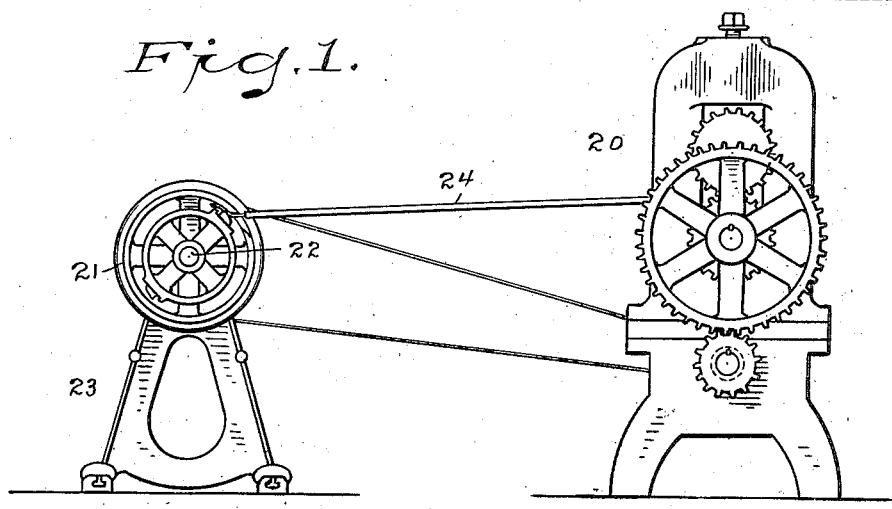

No. 812,709.  
PATENTED FEB. 13, 1906.  
W. R. WEBSTER.  
DRUM FOR COILING METAL.  
APPLICATION FILED APR. 27, 1905.

3 SHEETS—SHEET 1.

WITNESSES:  
H. A. Lamb.  
S. W. Atherton

INVENTOR  
William R. Webster  
BY  
A. M. Webster  
ATTORNEY

No. 812,709. PATENTED FEB. 13, 1906.
W. R. WEBSTER.
DRUM FOR COILING METAL.
APPLICATION FILED APR. 27, 1905.

3 SHEETS—SHEET 2.

WITNESSES:
H. A. Lamb
S. W. Atherton

INVENTOR
William R. Webster
BY
ATTORNEY

No. 812,709. PATENTED FEB. 13, 1906.
W. R. WEBSTER.
DRUM FOR COILING METAL.
APPLICATION FILED APR. 27, 1905.
3 SHEETS—SHEET 3.
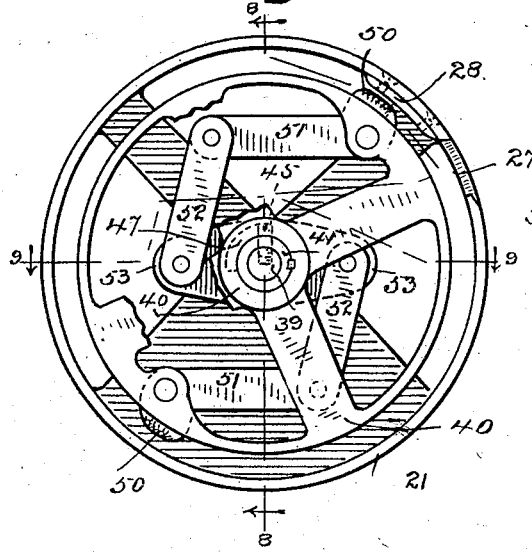
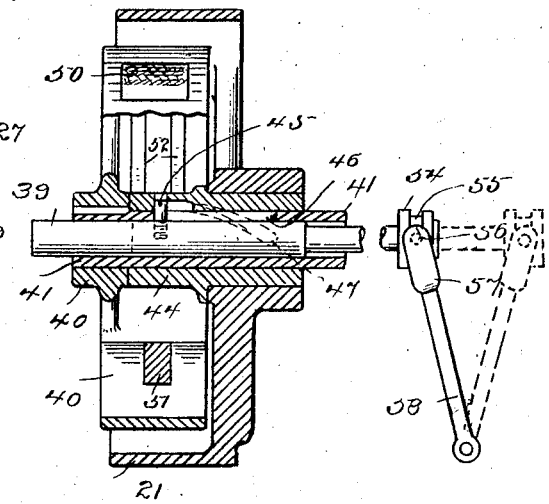
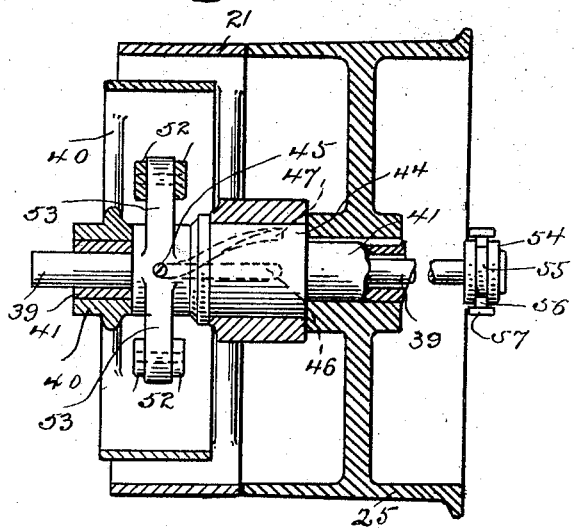
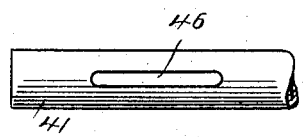
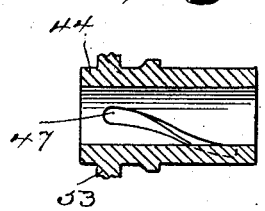
WITNESSES:
H. H. Lamb
S. W. Atherton
INVENTOR
William R. Webster
BY
T. M. Wooster
ATTORNEY

UNITED STATES PATENT OFFICE.

WILLIAM R. WEBSTER, OF BRIDGEPORT, CONNECTICUT.

DRUM FOR COILING METAL.

No. 812,709. Specification of Letters Patent. Patented Feb. 13, 1906.

Application filed April 27, 1905. Serial No. 257,660.

*To all whom it may concern:*

Be it known that I, WILLIAM R. WEBSTER, a citizen of the United States, residing at Bridgeport, county of Fairfield, State of Connecticut, have invented a new and useful Drum for Coiling Metal, of which the following is a specification.

This invention has for its object to produce a drum for coiling sheet metal, wire, rods, &c., which shall be especially adapted for coiling the metal while cold, the essential feature of novelty being that the forward end of the metal to be coiled forms the connection between a loose drum and a carrier within it.
With this and other objects in view I have devised the novel coiling-drum which I will now describe, referring to the accompanying drawings, forming a part of this specification, and using reference characters to indicate the several parts.

Figure 2:
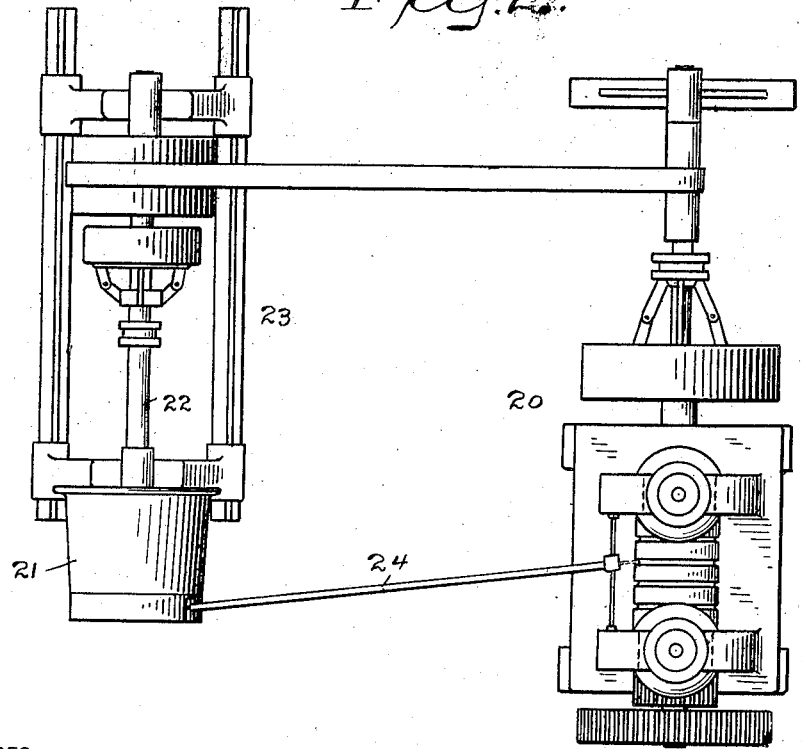
Figure 3:
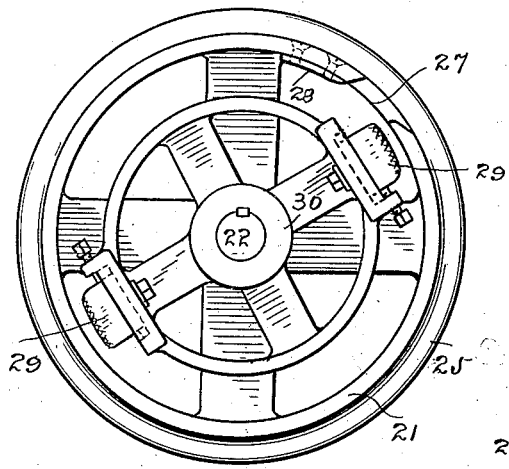
Figure 4:
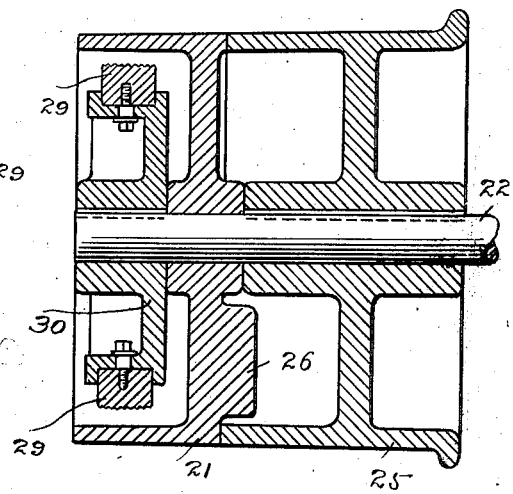
Figure 5:
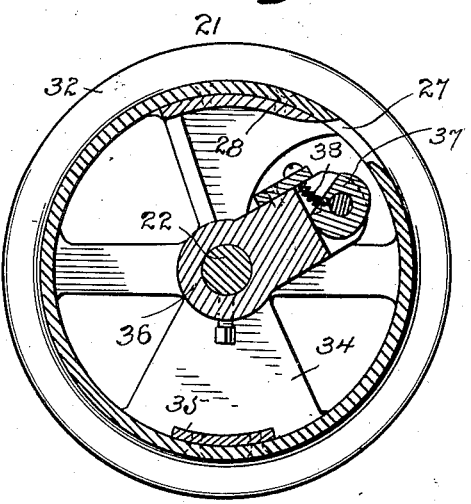

Figure 1 is an end elevation, and Fig. 2 a plan view, illustrating the operation of my novel coiling-drum in connection with wire-rod rolls. Fig. 3 is an elevation, and Fig. 4 a longitudinal section, on an enlarged scale, illustrating one form of my novel coiling-drum. Fig. 5 is a cross-section, and Fig. 6 a longitudinal section, illustrating another form of my novel coiling-drum. Fig. 7 is an end elevation, partly broken away, illustrating still another form of my novel coiling-drum; Fig. 8, a section on the line 8 8 in Fig. 7; Fig. 9, a section on the line 9 9 in Fig. 7; Fig. 10, an elevation of the inner sleeve detached, and Fig. 11 is a longitudinal section of the outer sleeve detached.

20 denotes a rolling-machine as a whole, which will not be described in detail, as it forms no portion of my present invention, which is equally applicable to the coiling of sheet metal as it emerges from the rolls.

21 denotes the drum proper, which is loosely mounted upon a shaft 22, journaled in suitable framework 23. When the drum is used for coiling wire, the wire may be delivered thereto from the drawing-rolls by means of an adjustable delivery-tube 24.

In the form illustrated in Figs. 1, 2, 3, and 4, which is shown as adapted for coiling wire, the drum 21 may be made tapering and its capacity may be increased to any required extent by the addition of a correspondingly-tapering part 25, which is rigidly secured to the shaft, as by a key. 27 denotes an opening in the periphery of the drum, through which the end of wire may be passed. Just within opening 27 is a locking-surface 28, which in practice is ordinarily raised and may be a detachable block, as shown in the drawings.

29 denotes locking-blocks adjustably secured to a carrier 30, in this form a wheel which lies within the drum and is rigidly secured to the shaft, as by a key. The gripping-surfaces of locking-blocks 29, and locking-surface 28 also, if found desirable, may be corrugated or roughened in any manner to adapt them to grip the end of metal firmly. Locking-blocks 29 are shown as adjustably secured to the carrier in order that they may be adjusted to better adapt them to grip different sizes of wire or rod.

It should be understood that fixed part 25 of the drum is merely supplemental and is not an essential portion of the invention, but may be dispensed with. The object of part 25 is to give greater carrying capacity to the drum, so as to adapt it for large coils of wire or rod. For this reason the supplemental portion of the drum is rigidly secured to the shaft.

26 denotes a counterweight which acts to retain the drum, which is loose on the shaft, in such a position that an end of metal may be conveniently passed into the opening.

In use, as already stated, the carrier rotates with the shaft and the drum is loose thereon. An end of wire, rod, or sheet metal to be coiled is passed into opening 27 and is instantly picked up by one of the locking-blocks 29 on the carrier and gripped between said locking-block and the locking-surface 28 on the drum, which is then caused to rotate with the carrier and part 25, the end of metal thus forming the connection between the fixed and loose portions of the structure and the grip upon the metal being so strong that it is practically impossible for it to slip.

Figure 6:
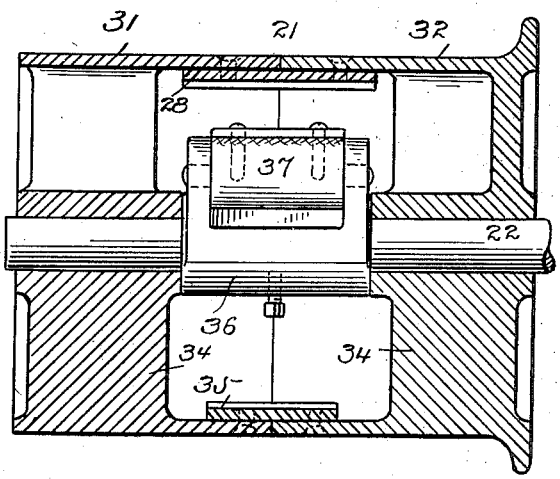

In the form illustrated in Figs. 5 and 6 the drum may be made in one piece, or, if preferred, in two pieces, (specifically indicated by 31 and 32,) rigidly secured together, as shown in the drawings. In this form, which is shown as adapted for coiling sheet metal, the drum is cylindrical in form and is provided, as before, with a peripheral opening 27 to receive the end of a strip of sheet metal or a lip projecting therefrom. Just forward of the opening is a locking-surface 28, in the present instance a plate, which also serves as a means for securing the two parts of the drum together, and opposite the locking-block is a plate or cross-piece 35, which also serves to secure the two parts of the drum together. 34 denotes counterweights which act to retain the drum, which is loose on the shaft, with the opening in convenient position for the insertion of the end of a strip of sheet metal. The carrier in this form (indicated by 36) is rigidly secured to the shaft at the mid-length of the drum. 37 denotes a locking-block on the carrier, which in this form is pivoted on the carrier longitudinally thereto and is cushioned upon a spring or springs 38, which bear against the carrier below the pivot of the block, and thus make the structure self-adjusting to varying thicknesses of metal.

The form illustrated in Figs. 7 to 11, inclusive, is equally adapted for coiling wire, rods, or strips of sheet metal. A fixed part, as 25 in Fig. 9, may or may not be used, as preferred. The shaft in this form (indicated by 41) is made hollow, and the carrier, which is a wheel and indicated by 40, is rigidly secured to the shaft, as by a key. The drum 21 is mounted loosely on a sleeve 44, which in turn is adapted to oscillate on the hollow shaft. 39 denotes a longitudinally-movable rod which lies within the hollow shaft and is provided with a radial pin 45, which engages a longitudinal slot 46 in the shaft and a spiral slot 47 in the sleeve. The drum is provided with an opening 27 and a locking-surface 28, as in the other forms.

50 denotes locking-blocks—two in the present instance—which are pivoted in slots in the periphery of the carrier and are provided with arms 51, which are connected, by means of links 52, with arms 53, which extend from sleeve 44. The shaft is provided with a hub 54, having a circumferential groove 55, which is engaged by pins 56 on a yoke 57, carried by an operating-lever 58. Longitudinal movement of the rod by means of the operating-lever will cause pin 45 to move along the longitudinal slot in the shaft and the spiral slot in the sleeve and will oscillate the sleeve, and consequently the locking-blocks, on the carrier and cause them to grip or release an end of metal, either wire, rod, or sheet metal. The counterweights normally hold the drum in such a position that the opening will conveniently receive an end of metal. A movement of the rod in one direction places the locking-blocks on the carrier in the unlocking or receiving position. When the rod is moved in the opposite direction, said blocks are oscillated and caused to grip an end of metal inserted in the opening and passed between one of the locking-blocks on the carrier and the locking-surface on the drum, and the drum will then be carried forward by the carrier and the metal coiled thereon. When the rod is again moved in the opposite direction, the locking-blocks on the carrier will be oscillated backward and the end of metal will be released, thus enabling the operator to remove the coil without stopping the shaft and effecting an important saving of time, as the ends of the strips of metal may be engaged and the strips coiled and removed while the shaft is in continuous rotation.

Having thus described my invention, I claim—

1. A coiling-drum comprising a loose drum having a peripheral opening and a locking-surface and a rotating carrier within the drum, said parts being so constructed that the insertion of the end of a piece of metal between them will connect them together and the drum will be rotated by the carrier and the metal coiled thereon.

2. A coiling-drum consisting of a loose drum having a peripheral opening and forward of said opening a locking-surface, and a rotating carrier having a coacting locking-block adapted to grip an end of metal between itself and the locking-surface on the drum so that said end of metal will serve as a connection between the carrier and the drum and the drum will be carried forward by the carrier and the metal coiled thereon.

3. A coiling-drum comprising a loose drum having a peripheral opening and a locking-surface, a rotatable carrier having a pivoted coacting locking-block and means for oscillating the locking-block on the carrier so that it will grip or release an end of metal inserted in the opening.

4. A coiling-drum comprising a loose drum having a peripheral opening and a locking-surface, a rotatable carrier having a pivoted coacting locking-block, an arm extending therefrom, an oscillatory sleeve having an arm extending therefrom, and a link connecting the arm extending from the sleeve with the arm extending from the locking-block on the carrier, substantially as described, for the purpose specified.

5. In a device of the character described the combination with a hollow shaft having a longitudinal slot, a carrier rigidly secured thereto and a sleeve loose thereon and having extending arms and a spiral slot, of a drum loosely mounted on the sleeve and having a peripheral opening and a locking-surface, locking-blocks pivoted on the carrier and having arms extending therefrom, links connecting said arms with the arms extending from the sleeve, and a rod within the shaft having a pin engaging the slot therein and the spiral slot in the sleeve so that longitudinal movement of the rod will oscillate the sleeve and the locking-blocks upon the carrier and cause them to grip or release an end of metal passed through the opening in the drum.

6. The combination with a shaft, a drum fixed thereto and a drum loose thereon and having a peripheral opening and a locking-surface, of a rotating carrier fixed to the shaft and lying within the loose drum and a locking-block on the carrier adapted to grip an end of metal between itself and the locking-surface on the loose drum, said end of metal serving as a connection between the loose drum and the carrier, shaft and fixed drum, so that all of the parts will rotate together.

In testimony whereof I affix my signature in presence of two witnesses.

WILLIAM R. WEBSTER.

Witnesses:
   A. M. WOOSTER,
   S. W. ATHERTON.